Figure 1:
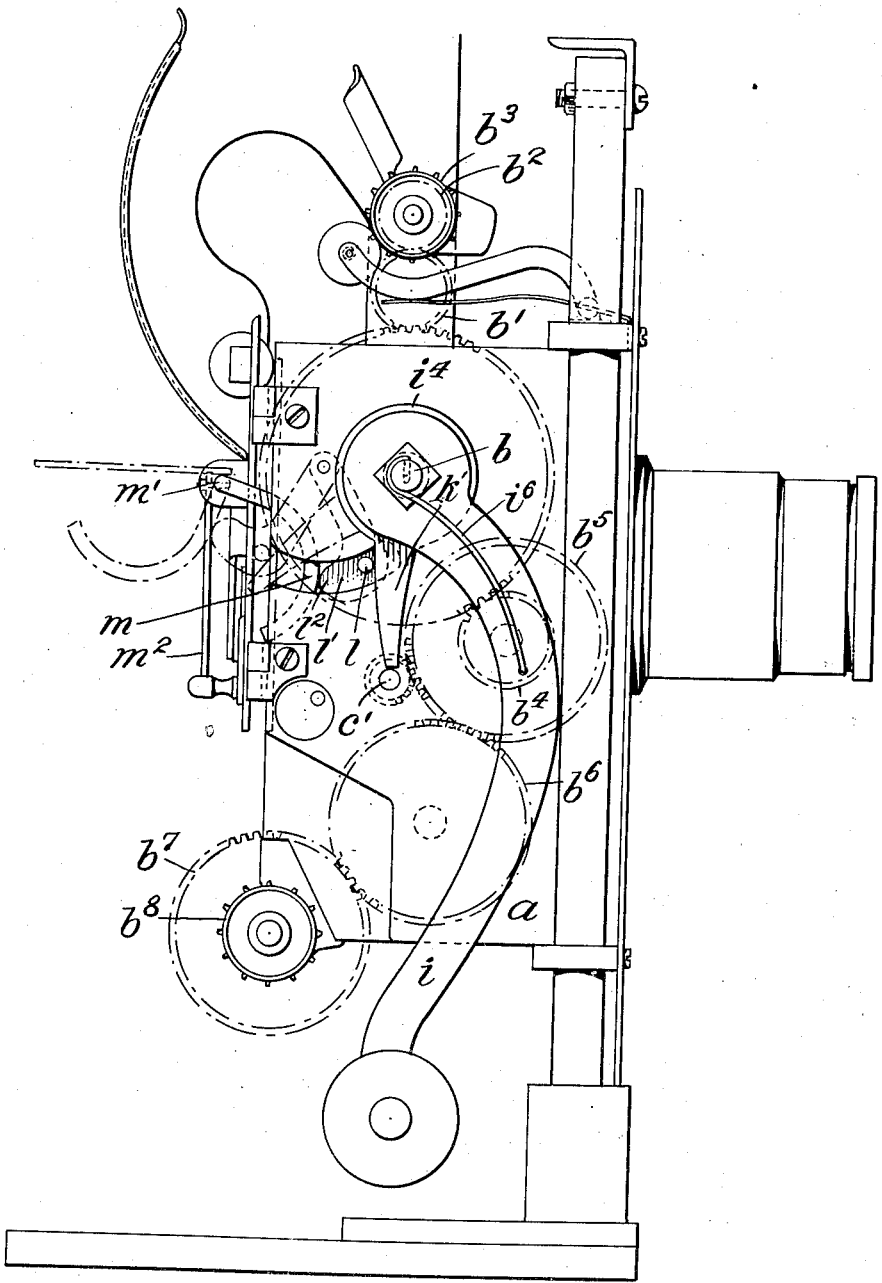

E. M. WOODEN.
KINETOSCOPE.
APPLICATION FILED MAR. 11, 1909.

929,743.

Patented Aug. 3, 1909.
4 SHEETS—SHEET 1.

Attest:

Inventor:
Earle M. Wooden
by Redding, Greeley & Austin
Attys.

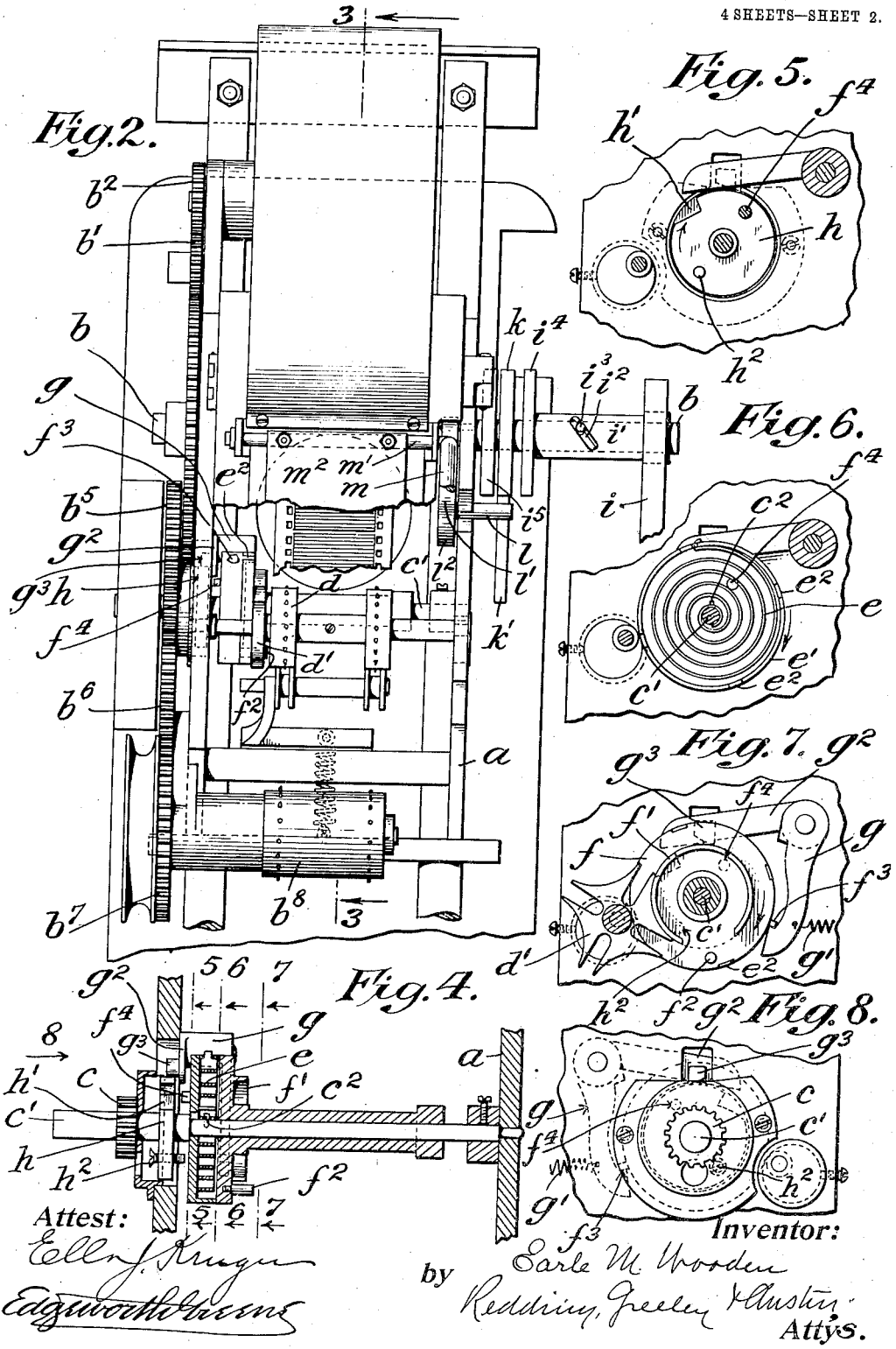

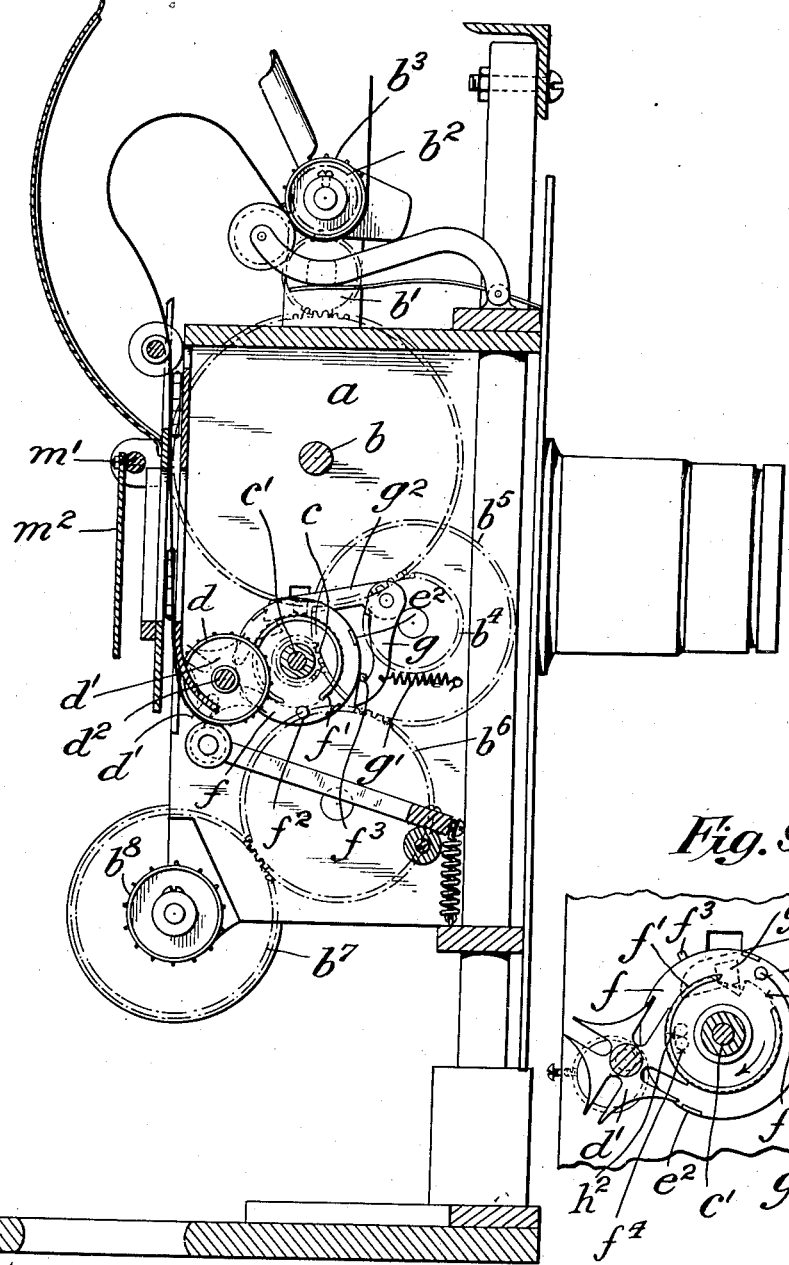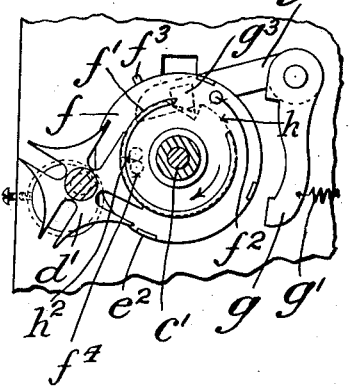

E. M. WOODEN.
KINETOSCOPE.
APPLICATION FILED MAR. 11, 1909.
929,743.
Patented Aug. 3, 1909.
4 SHEETS—SHEET 4.
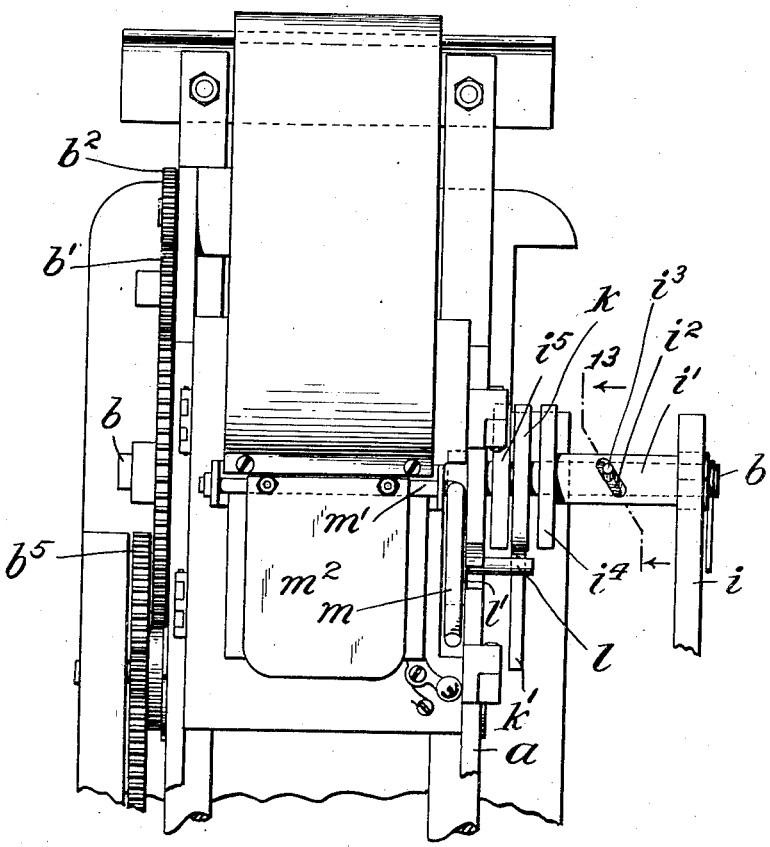
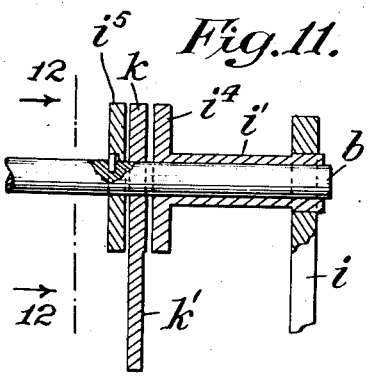
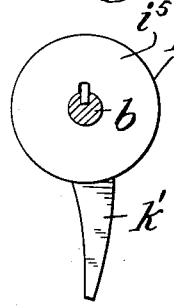
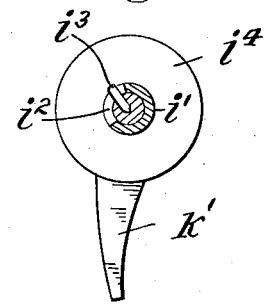
Attest:
Inventor:
Earle M. Wooden
by Redding, Greeley & Austin
Attys.

UNITED STATES PATENT OFFICE.

EARLE M. WOODEN, OF NEW YORK, N. Y., ASSIGNOR OF ONE-HALF TO RUBE R. FOGEL, OF NEW YORK, N. Y.

KINETOSCOPE.

No. 929,743.   Specification of Letters Patent.   Patented Aug. 3, 1909.

Application filed March 11, 1909. Serial No. 482,763.

*To all whom it may concern:*

Be it known that I, EARLE M. WOODEN, a citizen of the United States, residing in the borough of Manhattan, of the city of New York, in the State of New York, have invented certain new and useful Improvements in Kinetoscopes, of which the following is a specification, reference being had to the accompanying drawings, forming a part hereof.

This invention relates to kinetoscopes or moving picture machines and is particularly concerned with the mechanism for effecting the movement of the film.

The movement of the film is usually effected by a Geneva or star wheel gear which permits the proper dwell in the movement of the film and effects a relatively quick movement of the film between successive dwells. However, with the simple Geneva or star wheel the movement of the film is not sufficiently rapid to prevent a flicker on the screen which is unpleasant and trying to the eyes of the spectators.

It is, therefore, the object of the present invention, so far as it relates to the movement of the film, to so improve the mechanism for moving the film that the dwell shall be relatively longer and the period of movement of the film relatively shorter than is now possible, so that the flicker of the images on the screen shall not be appreciable. At the same time provision is made whereby it is impossible to skip or overthrow and each picture on the film therefore receives its proper exposure on the screen.

The invention will be more fully explained hereinafter with reference to the accompanying drawings in which it is illustrated and in which—

Figure 1 is a view of the improved machine in elevation as seen from the right hand side. Fig. 2 is a partial view of the machine in front elevation, some parts being broken away to permit parts beyond them to be shown and other parts being broken off to save space. Fig. 3 is a view in section on the plane indicated by the line 3—3 of Fig. 2, looking in the direction of the arrows. Fig. 4 is a detail view in section, and on a larger scale than Fig. 2, of the improved mechanism for effecting the movement of the film. Fig. 5 is a detail view in section on the plane indicated by the line 5—5 of Fig. 4, looking in the direction of the arrows. Fig. 6 is a detail view in section on the plane indicated by the line 6—6 of Fig. 4, looking in the direction of the arrows. Fig. 7 is a detail view in section on the plane indicated by the line 7—7 of Fig. 4, looking in the direction of the arrows. Fig. 8 is a detail view in elevation of the parts shown in Fig. 4 as seen from the left hand. Fig. 9 is a view similar to Fig. 7 but showing the parts in different positions. Fig. 10 is a detail view in front elevation of the upper portion of the machine, illustrating particularly the devices for operating or controlling the safety shutter. Fig. 11 is a detail view, partly in longitudinal section, of the devices for operating or controlling the shutter. Fig. 12 is a detail view in section on the plane indicated by the line 12—12 of Fig. 11, looking in the direction of the arrows. Fig. 13 is a detail view in section on the irregular plane indicated by the line 13—13 of Fig. 10, looking in the direction of the arrows.

The machine may be constructed as usual except with respect to the devices with which the invention is particularly concerned. As shown in the drawings, it comprises a suitable standard or supporting frame $a$ upon which the various moving parts of the mechanism are mounted in any convenient manner. The main driving shaft $b$, to which motion may be imparted from any suitable source of power, is operatively connected, through a suitable train of gearing $b'$ and $b^2$, to the upper feed roll $b^3$, and is also connected through a suitable train of gearing $b^4, b^5, b^6$ and $b^7$, to the lower or take-up roll $b^8$. The gear $b^5$ of the last mentioned train of gears also meshes with a pinion $c$ on a shaft $c'$ which drives, through the devices hereinafter described, the feed roll $d$ by which the step by step movement of the film is effected. Usually the shaft $c'$ carries the pin-and-flange bearing member of the Geneva train, which coöperates with the star wheel $d'$ on the shaft $d^2$ of the feed roll $d$, so that the relative duration of the period of movement and the period of rest of the film is directly dependent upon the usual action of the Geneva train. In the present case, however, the pin-and-flange bearing member of the train is caused to have a very much quicker effective movement than is ordinarily the case so that the movement of the star wheel and therefore of the feed roll is almost instantaneous while the period of rest of the film is proportionately prolonged, thus preventing the flicker which is due to the usually longer period of movement and shorter period of rest.

In the construction shown, the shaft $c'$, constantly rotating, is engaged, as by a stud $c^2$, with one end of a clock spring $e$, as clearly shown in Figs. 4 and 6, constantly putting the spring under tension while the machine is in operation. The other end of the spring $e$ is secured to a spring drum $e'$ which is mounted loosely on the shaft $c'$ and engages, as by lugs $e^2$, the member $f$ of the Geneva train which carries the usual interrupted flange $f'$ for coöperation with the star wheel $d'$. This wheel or member $f$, however, instead of being fast upon the shaft $c'$, is loose thereon and moves only with the spring drum $e'$ under the action of the spring $e$. The spring drum $e'$ and wheel $f$ are held from rotation during nearly an entire single rotation of the shaft $c'$ by a latch $g$ or dog $g$, one arm of which engages a lug $f^3$ on the wheel or member $f$. The spring $g'$ tends to pull the latch or dog out of the path of the lug so as to permit the wheel or member to rotate, but is held in the path of such lug except for a very brief portion of the rotation of the shaft $c'$ by the other arm $g^2$ of the latch which carries a lug $g^3$ normally resting on the periphery of a disk $h$ which is fast on the shaft $c'$ and has a cam notch $h'$, which, at each rotation of the shaft $c'$, permits the lug $g^3$ on the arm $g^2$ to move into the notch under the influence of the spring $g'$, and the latch or dog $g$ to move out of the path of the lug $f^3$ on the member $f$. The member $f$ is therefore stationary during nearly the entire single rotation of the shaft $c'$ but moves with great rapidity under the influence of the spring $e$ as soon as it is released. The swift movement of the member $f'$ produces a correspondingly swift partial rotation of the star wheel $d'$ and feed roll $d$, and a correspondingly swift and almost instantaneous forward movement of the film. To prevent overrunning of the member $f$, a pin or lug $f^4$ is secured on the side of the member $f$ in the path of movement of a corresponding pin or lug $h^2$ on the side of the disk $h$, so that the member $f$ can at no time move farther than to overtake the disk $h$. The movement of the feed roll $d$ is therefore absolutely timed by the rotation of the shaft $c'$, a single forward movement of the film taking place at each complete rotation of the shaft $c'$. To increase or diminish the tension of the spring $e$, the spring drum $e'$ and member $f$ are separated to disengage the lugs $e^2$ on the spring drum from the slots in the member $f$ and such relative rotation of the two, in one direction or the other, is effected or permitted as may be necessary to secure the proper tension for the spring. In Figs. 5, 7 and 8, the lug $g^3$ on the arm $g^2$ of the latch $g$ is shown as resting upon the periphery of the notched disk $h$ just before the notch reaches the lug and the release of the member $f$ is permitted, while in Fig. 9 the lug $g^3$ is shown as having entered the cam notch under the influence of the spring $g'$.

The mechanism for controlling the safety shutter is shown particularly in Figs. 1 and 10–13. As shown, the shaft $b$ is driven by a crank $i$. The latter is mounted on the shaft, with provision for lost motion, through a sleeve $i'$ which has an obliquely disposed slot $i^2$ embracing a pin $i^3$ in the shaft $b$. At the inner end of the sleeve $i'$ is a friction disk $i^4$ and secured on the shaft $b$ is a second friction disk $i^5$. Loosely mounted on the shaft $b$, between the friction disks $i^4$ and $i^5$, is a friction disk $k$, provided with an arm $k'$. It will be evident that when power is applied to the crank $i$ to drive the machine, the disk $i^4$ will be carried toward the disk $i^5$, through the coöperation of the slot $i^2$ and pin $i^3$ clamping the disk $k$ between the disks $i^4$ and $i^5$ and rotating it forward until the forward movement of the arm $k'$ is checked and that the arm $k'$ will be held in its new position during the continued forward movement of the crank $i$, the disks $i^4$ and $i^5$ slipping upon the disk $k$. It will also be evident that as soon as the driving force on the crank is relieved, the crank will drop backward, if it be in its upward movement, or will be thrown backward by a spring $i^6$ if it has passed its highest point and is moving downward. Such backward movement of the crank with respect to the shaft $b$ will cause the disk $i^4$ to move away from the disk $i^5$, through the coöperation of the slot $i^2$ and pin $i^3$, thereby releasing the disk $k$, the arm $k'$ of which will immediately fall to a vertical position below the shaft $b$. In its forward or upward movement the arm $k'$ strikes a pin $l$ which projects through the side of the frame from an arm $l'$. The toe $l^2$ of the arm co-acts with an arm $m$ of the shaft $m'$ which carries the drop shutter $m^2$. The arm $k'$, in its forward or upward movement, therefore lifts the shutter and holds it raised so long as driving power is applied to the shaft $b$, but as soon as the driving power is discontinued the arm $k'$ drops and therefore permits the shutter $m^2$ to drop.

It will be understood that various details of construction and arrangement may be made to suit different conditions of use and that the invention is not limited to the precise construction shown and described herein.

I claim as my invention:

1. In a machine of the character described, the combination with the feed roll, star wheel and driving shaft therefor, of a spring impelled driving member for the star wheel mounted loosely and means to hold the driving member from rotation during a portion of the rotation of the shaft and to release it for forward impulses by the spring.

2. In a machine of the character described, the combination with the feed roll, star wheel and driving shaft therefor, of a star-wheel-driving member mounted loosely on the shaft, a spring connected at one end to the driving member and at the other end to the shaft and means to hold the driving member from rotation during a portion of the rotation of the shaft and release it to be driven forward by the spring.

3. In a machine of the character described, the combination with the feed roll, star wheel and driving shaft therefor, of a star-wheel-driving member mounted loosely on the shaft, a spring connected at one end to the shaft and at the other end to the driving member, a latch normally holding the driving member from rotation and means actuated by the forward rotation of the shaft to disengage the latch.

4. In a machine of the character described, the combination with the feed roll, star wheel and driving shaft therefor, of a star-wheel-driving member mounted loosely on the shaft, a spring connected at one end on the shaft and at the other end to the driving member, a latch normally holding the driving member from rotation and a notched cam disk carried by the shaft and coöperating with the latch to hold it normally in engagement with the driving member and to permit its disengagement at a predetermined point.

5. In a machine of the character described, the combination with the feed roll, star wheel and driving shaft therefor, of a spring impelled star-wheel-driving member loosely mounted, means to hold said member from rotation and release the same and means to prevent overrunning of said member with respect to the driving shaft.

6. In a machine of the character described, the combination with the feed roll, star wheel and driving shaft therefor, of a star-wheel-driving member, spring impelled, loosely mounted on the shaft, means to hold said driving member from rotation and to release the same and a disk secured on the shaft adjacent to said driving member, said disk and said driving member having projections in the same path of rotation whereby said driving member is prevented from over running with respect to the shaft.

This specification signed and witnessed this 6th day of March, A. D., 1909.

EARLE M. WOODEN.

Signed in the presence of—
W. B. GREELEY,
AMBROSE L. O'SHEA.